United States Patent [19]
Arnold

[11] Patent Number: 5,956,845
[45] Date of Patent: Sep. 28, 1999

[54] METHOD OF REPAIRING A TURBINE ENGINE AIRFOIL PART

[75] Inventor: James E. Arnold, New Haven, Conn.

[73] Assignee: Recast Airfoil Group, North Haven, Conn.

[21] Appl. No.: 08/993,116

[22] Filed: Dec. 18, 1997

Related U.S. Application Data

[60] Provisional application No. 60/033,858, Dec. 23, 1996.

[51] Int. Cl.$^6$ ....................................................... B23P 15/00
[52] U.S. Cl. .................. 29/889.1; 29/402.07; 29/402.18
[58] Field of Search .................... 29/889.1, 889, 29/402.07, 402.06, 402.18; 228/119

[56] References Cited

U.S. PATENT DOCUMENTS

| | | |
|---|---|---|
| 4,028,787 | 6/1977 | Cretella et al. . |
| 4,145,481 | 3/1979 | Gupta et al. . |
| 4,291,448 | 9/1981 | Cretella et al. . |
| 4,370,789 | 2/1983 | Schilke et al. . |
| 4,455,278 | 6/1984 | van Nederveen et al. . |
| 4,630,692 | 12/1986 | Ecer . |
| 4,822,248 | 4/1989 | Wentz et al. .......................... 29/889.1 |
| 4,837,389 | 6/1989 | Shankar et al. . |
| 4,866,828 | 9/1989 | Fraser . |
| 4,921,405 | 5/1990 | Wilson . |
| 5,071,054 | 12/1991 | Dzugan et al. . |
| 5,156,321 | 10/1992 | Liburdi et al. . |
| 5,363,554 | 11/1994 | Partridge et al. ...................... 29/889.1 |
| 5,448,828 | 9/1995 | Willems et al. . |
| 5,451,142 | 9/1995 | Cetal et al. . |
| 5,525,429 | 6/1996 | Mannava et al. ...................... 29/889.1 |
| 5,558,922 | 9/1996 | Gupta et al. ........................... 29/889.1 |
| 5,584,663 | 12/1996 | Shell et al. . |
| 5,593,726 | 1/1997 | Nichols et al. . |
| 5,662,638 | 9/1997 | Johnson et al. . |
| 5,732,467 | 3/1998 | White et al. . |
| 5,743,013 | 4/1998 | Taylor et al. ......................... 29/889.1 |

*Primary Examiner*—Irene Cuda
*Attorney, Agent, or Firm*—John J. Daniels

[57] ABSTRACT

A method of forming an engine airfoil part. The attributes of a final workpiece product are selected. An appropriate substrate composition is determined depending on the selected attributes. A workpiece substrate is formed to near-finished dimensions. An appropriate coating material composition is determined depending on the selected attributes. The workpiece substrate is prepared for a high-density coating process. The high-density coating process, such as HVOF thermal spray, is performed to coat the workpiece substrate with the coating material. The coating material is built-up to a thickness effective to obtain desired finished dimensions after performing a hot isostatic pressing treatment. The appropriate hot isostatic pressing treatment parameters are determined. The hot isostatic pressing treatment is performed on the coated workpiece substrate to obtain a metal product having the desired finished dimensions and diffusion bonding between the coating material and the workpiece substrate.

22 Claims, 9 Drawing Sheets

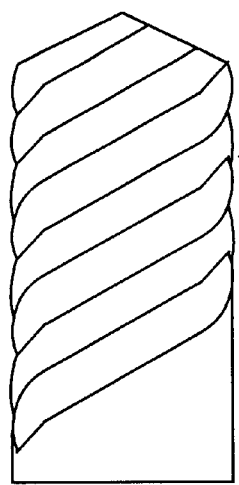
Figure 2(a)
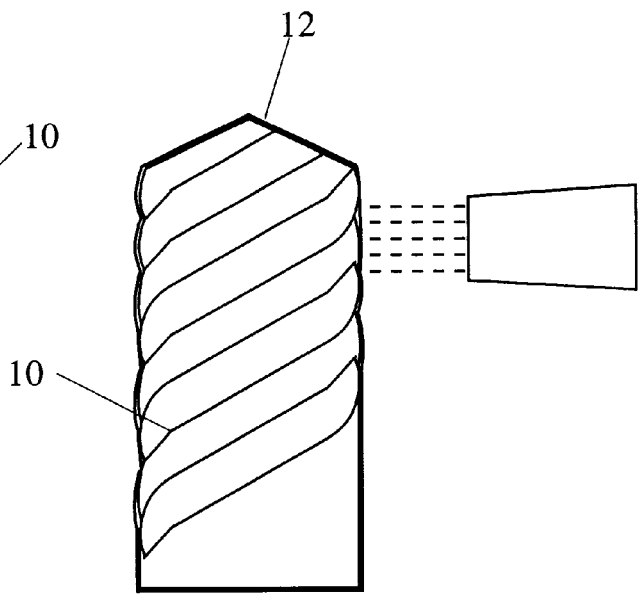
Figure 2(b)
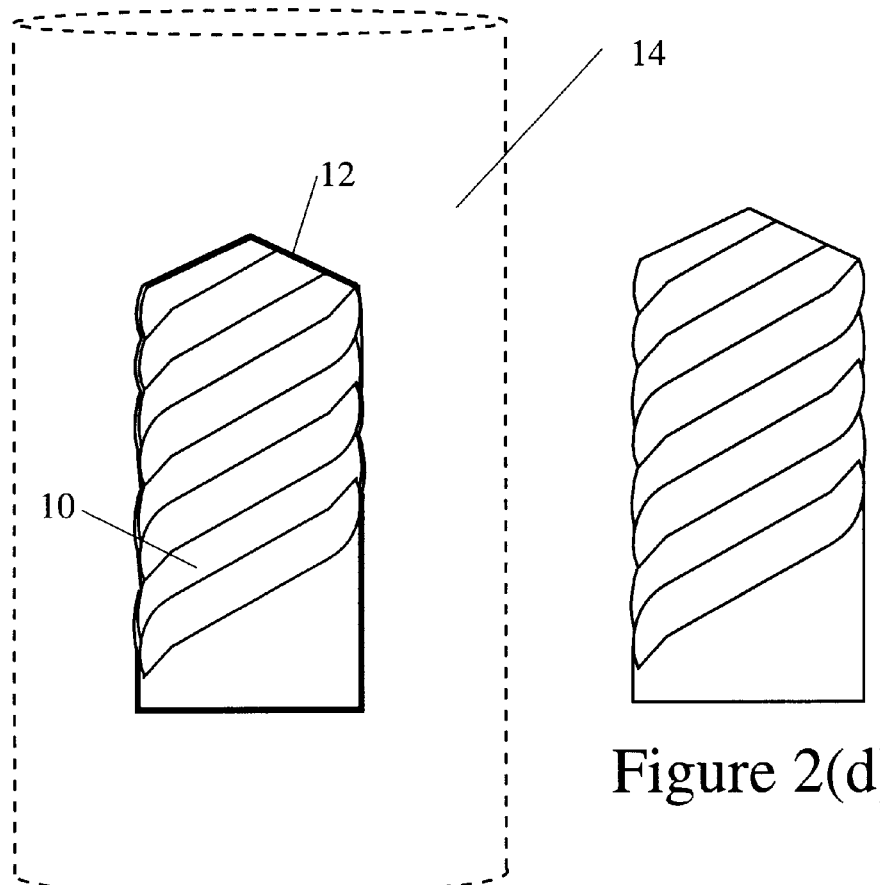
Figure 2(c)
Figure 2(d)

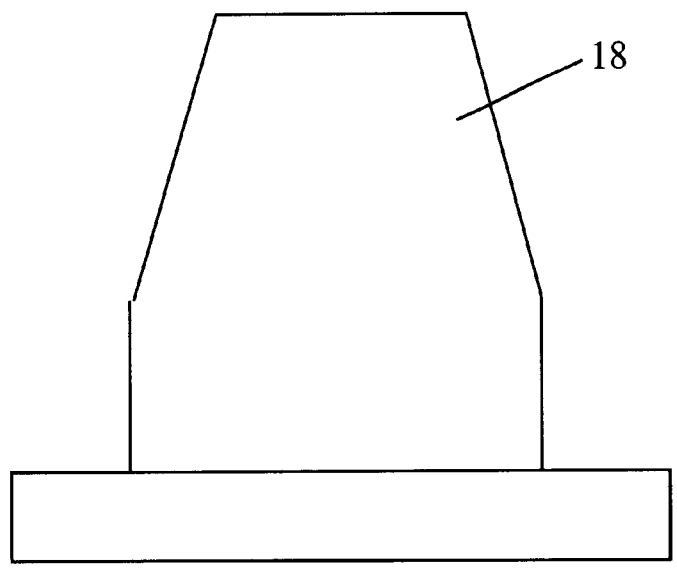
Figure 5(a)
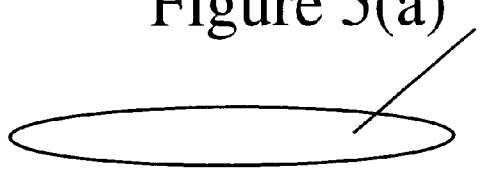
Figure 5(b)
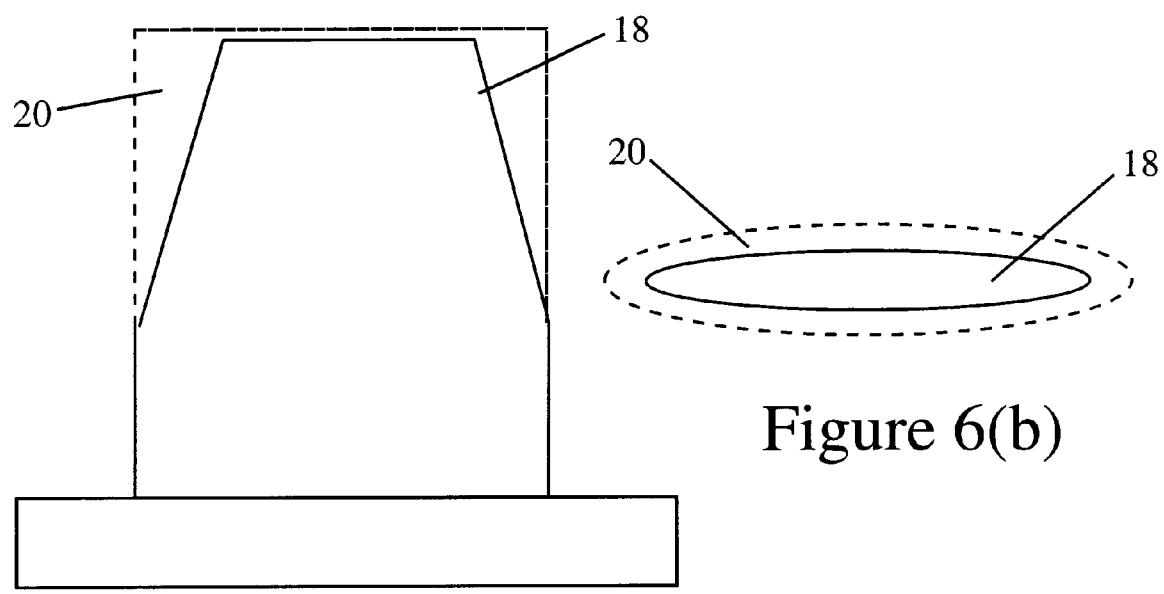
Figure 6(b)
Figure 6(a)

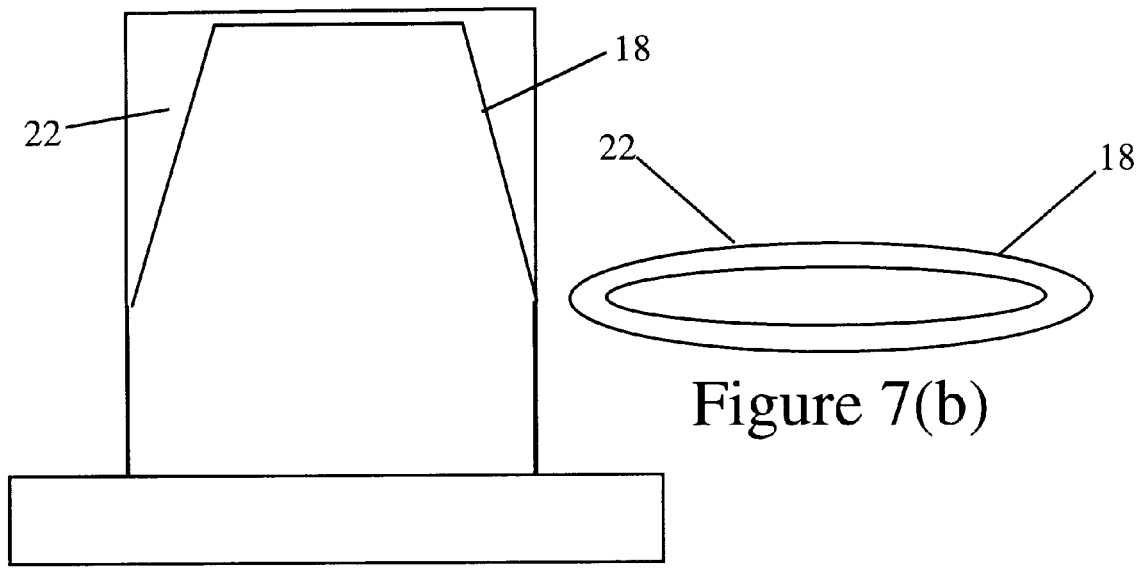
Figure 7(b)
Figure 7(a)
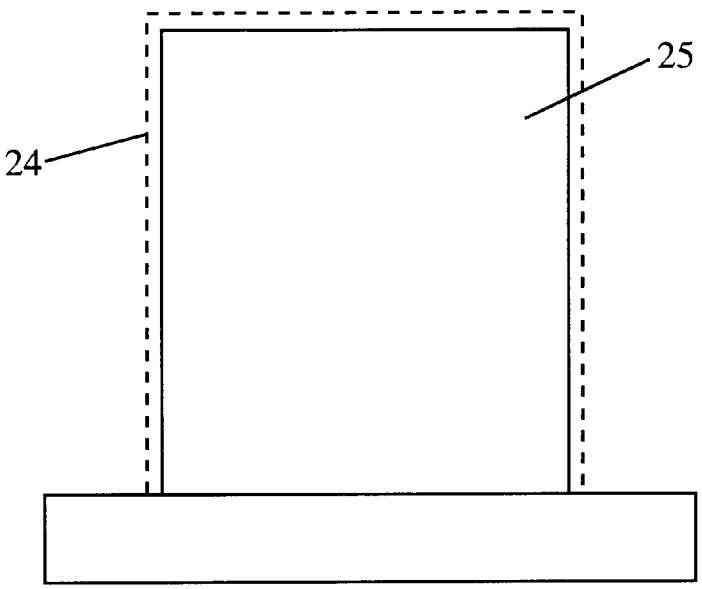
Figure 8(a)
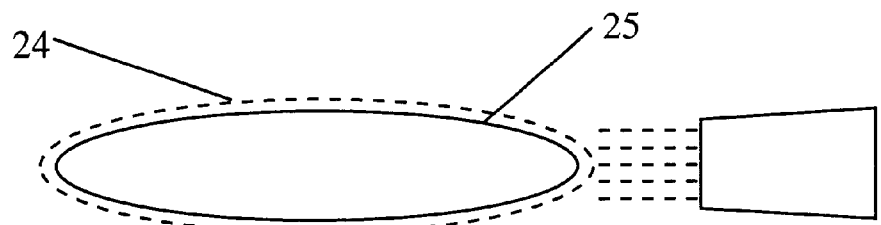
Figure 8(b)

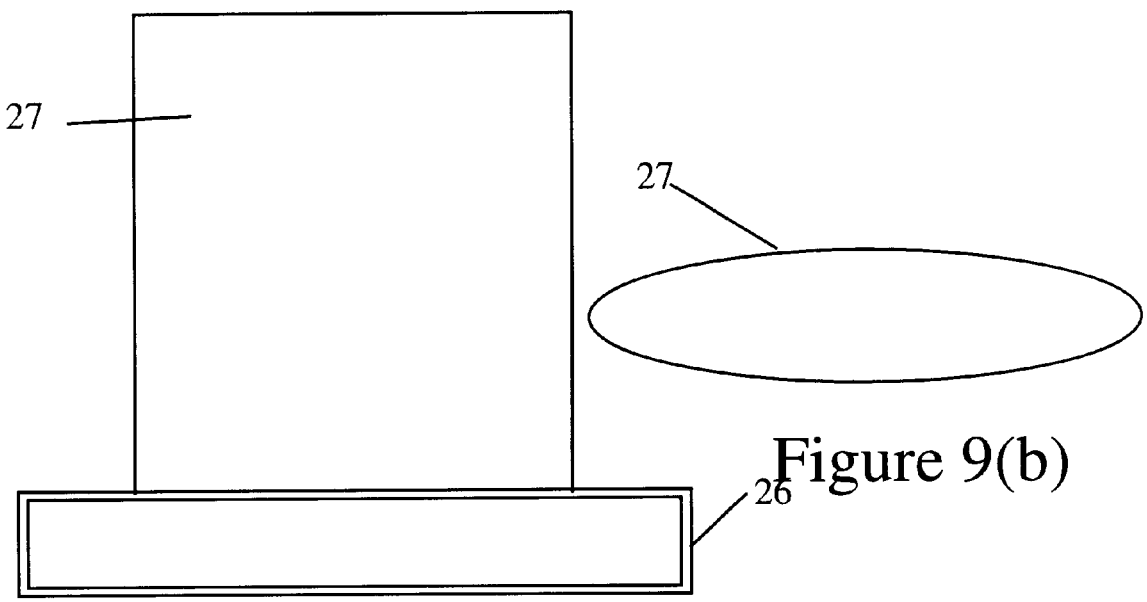
Figure 9(a)
Figure 9(b)
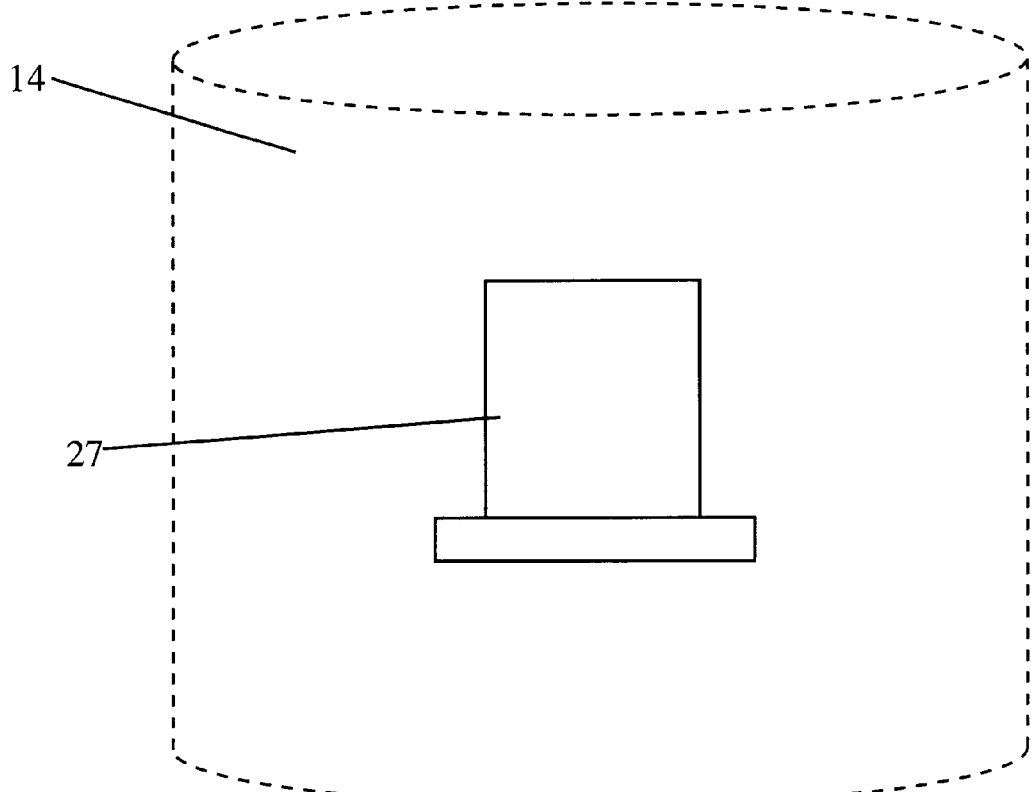
Figure 10

5,956,845

METHOD OF REPAIRING A TURBINE ENGINE AIRFOIL PART

CROSS-REFERENCE TO RELATED DOCUMENTS

The present invention is the U.S. utility patent application of a U.S. provisional application Ser. No. 60/033,858, filed Dec. 23, 1996; and relates to an invention disclosed in an Invention Disclosure Document accepted under the Disclosure Document program on or about Nov. 5, 1996 and assigned Disclosure Document No. 407616.

BACKGROUND OF THE INVENTION

The present invention pertains to a method of treating metal components. More particularly, the present invention pertains to a method of treating metal components by first building up a thickness of metal on a metal substrate using a Hyper Velocity Oxy-Fuel (HVOF) thermal spray process followed by a Hot Isostatic Pressing (HIP) heat treatment process.

Often during the manufacture of metal components a coating operation is performed to provide a coating material layer on the surface of a component substrate. The coating material layer is formed to build-up the metal component to desired finished dimensions and to provide the finished product with various surface attributes. For example, an oxide layer may be formed to provide a smooth, corrosion resistant surface. Also, a wear resistant coating, such as Carbide, Cobalt, or TiN is often formed on cutting tools to provide wear resistance.

Chemical Vapor Deposition is typically used to deposit a thin film wear resistant coating on a cutting tool substrate. For example, to increase the service life of a drill bit, chemical vapor deposition can be used to form a wear resistant coating of Cobalt on a high speed steel (HSS) cutting tool substrate. The bond between the substrate and coating occurs primarily through mechanical adhesion within a narrow bonding interface. During use, the coating at the cutting surface of the cutting tool is subjected to shearing forces resulting in flaking of the coating off the tool substrate. The failure is likely to occur at the marrow bonding interface.

FIG. 12(a) is a side view of a prior art tool bit coated with a wear resistant coating. In this case, the wear resistant coating may be applied by the Chemical Vapor Deposition method so that the entire tool bit substrate receives an even thin film of a relatively hard material, such as Carbide, Cobalt or TiN. Since the coating adheres to the tool bit substrate mostly via a mechanical bond located at a boundary interface, flaking and chipping off the coating off of the substrate is likely to occur during use, limiting the service life of the tool bit. FIG. 12(b) is a side view of a prior art tool bit having a fixed wear resistant cutting tip. In this case, a relatively hard metal cutting tip is fixed to the relatively soft tool bit substrate. The metal cutting tip, which is typically comprised of a Carbide or Cobalt alloy, is fixed to the tool bit substrate by brazing. During extended use the tool bit is likely to fail at the relatively brittle brazed interface between the metal cutting tip and the tool substrate, and again, the useful service life of the tool bit is limited.

Another coating method, known as Conventional Plasma Spray uses a super heated inert gas to generate a plasma. Powder feedstock is introduced and carried to the workpiece by the plasma stream. Conventional plasma spray coating methods deposit the coating material at relatively low velocity, resulting in voids being formed within the coating and in a coating density typically having a porosity of about 5.0%. Again, the bond between the substrate and the coating occurs primarily through mechanical adhesion at a bonding interface, and if the coating is subjected to sufficient shearing forces it will flake off of the workpiece substrate. Another coating method, known as the Hyper Velocity Oxyfuel (HVOF) plasma thermal spray process is used to produce coatings that are nearly absent of voids. In fact, coatings can be produced nearly 100% dense, with a porosity of less than 0.5%. In HVOF thermal spraying, a fuel gas and oxygen are used to create a combustion flame at 2500 to 3100° C. The combustion takes place at a very high chamber pressure and a supersonic gas stream forces the coating material through a small-diameter barrel at very high particle velocities. The HVOF process results in extremely dense, well-bonded coatings. Typically, HVOF coatings can be formed nearly 100% dense, with at a porosity of >0.5%. The high particle velocities obtained using the HVOF process results in relatively better bonding between the coating material and the substrate, as compared with other coating methods such as the Conventional Plasma spray method or the Chemical Vapor Deposition method. However, the HVOF process also forms a bond between the coating material and the substrate that occurs primarily through mechanical adhesion at a bonding interface.

Detonation Gun coating is another method that produces a relatively dense coating. Suspended powder is fed into a long tube along with oxygen and fuel gas. The mixture is ignited in a controlled explosion. High temperature and pressure is thus created to blast particles out of the end of the tube and toward the substrate to be coated.

Casting is a known method for forming metal components. Typically, a substrate blank is cast to near-finished dimensions. Various machining operations, such as cutting, sanding and polishing, are performed on the cast substrate blank to eventually obtain the metal component at desired finished dimensions. A casts metal component will typically have a number of imperfections caused by voids and contaminants in the cast surface structure. The imperfections may be removed by machining away the surface layer of the component, and/or by applying a surface coating.

All casting processes must deal with problems that the wrought processes do not encounter. Major among those are porosity and shrinkage that are minimized by elaborate gating techniques and other methods that increase cost and sometimes lower yield. However, the ability to produce a near net or net shape is the motivating factor. In some cases, it is more cost effective to intentionally cast the part, not using elaborate and costly gating techniques, and HIP treat the part to eliminate the sub-surface porosity. The surface of the part is then machined until the dense substrate is reached.

The manufacture of metal components often entails costly operations to produce products with the desired surface texture, material properties and dimensional tolerances. For example, a known process for manufacturing a metal component requires, among other steps, making a casting of the metal component, treating the metal component using a Hot Isostatic Pressing (HIP) treatment process, and then machining the metal component to remove surface imperfections and obtain the desired dimensional tolerances.

HIP treatment is used in the densification of cast metal components and as a diffusion bonding technique for consolidating powder metals. In the HIP treatment process, a part to be treated is raised to a high temperature and isostatic pressure. Typically, the part is heated to 0.6–0.8 times the melting point of the material comprising the part, and subjected to pressures on the order of 0.2 to 0.5 times the yield strength of the material. Pressurization is achieved by pumping an inert gas, such as Argon, into a pressure vessel. Within the pressure vessel is a high temperature furnace, which heats the gas to the desired temperature. The temperature and pressure are held for a set length of time, and then the gas is cooled and vented.

The HIP treatment process is used to produce near-net shaped components, reducing or eliminating the need for subsequent machining operations. Further, by precise control of the temperature, pressure and time of a HIP treatment schedule a particular microstructure for the treated part can be obtained.

Metal alloy components, such as gas turbine parts such as blades and vanes, are often damaged during use. During operation, gas turbine parts are subjected to considerable degradation from high pressure and centrifugal force in a hot corrosive atmosphere. The gas turbine parts also sustain considerable damage due to impacts from foreign particles. This degradation results in a limited service life for these parts. Since they are costly to produce, various repair methods are employed to refurbish damaged gas turbine blades and vanes.

Examples of methods employed to repair gas turbine blades and vanes include U.S. Pat. No. 4,291,448, issued to Cretella et al.; U.S. Pat. No. 4,028,787, issued to Cretella et al.; U.S. Pat. No. 4,866,828, issued to Fraser; and U.S. Pat. No. 4,837,389, issued to Shankar et al.

Cretella '448 discloses a process to restore turbine blade shrouds that have lost their original dimensions due to wear while in service. This reference discloses using the known process of TIG welding worn portions of a part with a weld wire of similar chemistry as the part substrate, followed by finish grinding. The part is then plasma sprayed with a material of similar chemistry to a net shape requiring little or no finishing. The part is then sintered in an argon atmosphere. The plasma spray process used in accordance with Cretella '448 results in a coating porosity of about 5.0%. Even after sintering the coating remains attached to the substrate and weld material only be a mechanical bond at an interface bonding layer making the finished piece prone to chipping and flaking.

Cretella '787 discloses a process for restoring turbine vanes that have lost their original dimensions due to wear while in service. Again, a conventional plasma spray process is used to build up worn areas of the vane before performing a sintering operation in a vacuum or hydrogen furnace. The porosity of the coating, and the interface bonding layer, results in a structure that is prone to chipping and flaking.

Fraser discloses a process to repair steam turbine blades or vanes that utilize some method of connecting them together (i.e. lacing wire). In accordance with the method disclosed by Fraser, the area of a part that has been distressed is removed and a new piece of like metal is welded to the part. The lacing holes of the part are plug welded. The part is then subjected to hot striking to return it to its original contour, and the lacing holes are re- drilled.

Shankar et al. disclose a process for repairing gas turbine blades that are distressed due to engine operation. A low-pressure plasma spray coating is applied to the vanes and the part is re-contoured by grinding. A coating of aluminum is then applied using a diffusion coating process. Again, the conventional low-pressure plasma spray process forms a mechanical bond at an interface boundary between the coating and the substrate, resulting in a structure that is prone to failure due to chipping and flaking.

SUMMARY OF THE INVENTION

The present invention overcomes the drawbacks of the conventional art and provides a method of forming, treating and/or repairing metal components so that the resulting metal component has improved metallurgical characteristics. It is an object of the present invention to provide a method of forming a metal product having diffusion bonding occurring between a metal substrate and an applied coating. It is another object of the present invention to provide a method of forming cutting tools having a wear resistant coating diffusion bonded to a cutting surface of a tool substrate. It is still another object of the present invention to provide a method of forming a cast metal product having a diffusion bonded coating formed on a cast metal component. It is yet another object of the present invention to provide a method of repairing turbine engine parts wherein a similar metal is diffusion bonded to a metal turbine engine part.

In accordance with the present invention, a method of forming a metal product having diffusion bonding occurring between a metal substrate and an applied coating is provided. The first step of the inventive method is to determine the attributes of a final workpiece product. For example, if the final workpiece product is a cutting tool the attributes include a wear resistant surface formed on a relatively inexpensive tool substrate. An appropriate substrate composition is then determined depending on the selected attributes. In the example of a cutting tool, the substrate composition may be high speed steel, which is relatively inexpensive to form but durable enough for its intended purpose. A workpiece substrate is formed to near-finished dimensions, using known processes such as casting, extruding, molding, machining, etc. An appropriate coating material composition is determined depending on the selected attributes. Again, in the example of a cutting tool, the coating material could be selected from a number of relatively hard and durable metals and alloys such as Cobalt, Carbide, TiN, etc. The selection of both the substrate and coating composition also depends on their metallurgical compatibility with each other.

The workpiece substrate is prepared for a high-density coating process. The preparation may include cleaning, blasting, machining, masking or other like operations. Once the workpiece substrate has been prepared, a high-density coating process is performed to coat the workpiece substrate. The coating material is built-up to a thickness that is effective to obtain desired finished dimensions after performing a hot isostatic pressing treatment (described below). The high-density coating process may comprise performing a hyper velocity oxy-fuel thermal spray process. In the case of HVOF, a fuel gas and oxygen are used to create a combustion flame at 2500 to 3100° C. The combustion takes place at a very high chamber pressure and a supersonic gas stream forces the coating material through a small-diameter barrel at very high particle velocities. The HVOF process results in extremely dense, well-bonded coatings. Typically, HVOF coatings can be formed nearly 100% dense, with at a porosity of about 0.5%. The high particle velocities obtained using the HVOF process results in relatively better bonding between the coating material and the substrate, as compared with other coating methods such as the conventional plasma spray method or the chemical vapor deposition method. However, the HVOF process also forms a bond between the coating material and the substrate that occurs primarily through mechanical adhesion at a bonding interface. As will be described below, in accordance with the present invention this mechanical bond is converted to a metallurgical bond by creating a diffusion bond between the coating material and the workpiece substrate. The diffusion bond does not have the interface boundary which is usually the site of failure.

The diffusion bond is created by subjecting the coated workpiece substrate to a hot isostatic pressing (HIP) treatment. The appropriate hot isostatic pressing treatment parameters are selected depending on the coating, the workpiece substrate and the final attributes that are desired. The hot isostatic pressing treatment is performed on the coated workpiece substrate to obtain a metal product having the desired finished dimensions and diffusion bonding between the coating material and the workpiece substrate.

HIP treatment is conventionally used in the densification of cast metal components and as a diffusion bonding technique for consolidating powder metals. In the HIP treatment process, a part to be treated is raised to a high temperature and isostatic pressure.

Typically, the part is heated to 0.6–0.8 times the melting point of the material comprising the part, and subjected to pressures on the order of 0.2 to 0.5 times the yield strength of the material. Pressurization is achieved by pumping an inert gas, such as Argon, into a pressure vessel. Within the pressure vessel is a high temperature furnace, which heats the gas to the desired temperature. The temperature and pressure is held for a set length of time, and then the gas is cooled and vented.

The HIP treatment process is used to produce near-net shaped components, reducing or eliminating the need for subsequent machining operations. Further, by precise control of the temperature, pressure and time of a HIP treatment schedule a particular microstructure for the treated part can be obtained.

In accordance with the present invention, the HIP treatment process is performed on a HVOF coated substrate to convert the adhesion bond, which is merely a mechanical bond, to a diffusion bond, which is a metallurgical bond. In accordance with the present invention, an HVOF coating process is used to apply the coating material having sufficient density to effectively undergo the densification changes that occur during the HIP process. If the coating material and the workpiece substrate are comprised of the same metal composition, then the diffusion bonding results in a seamless transition between the substrate and the coating.

The inventive method can be used for forming a metal product having a wear resistant surface. This method can be employed to produce, for example, a long lasting cutting tool from a relatively inexpensive cutting tool substrate. In accordance with this aspect of the invention, a workpiece substrate is formed to near-finished dimensions. A high-density coating process, such as a hyper velocity oxy-fuel thermal spray process, is performed to coat the workpiece substrate with a wear resistant coating material. The coating material is built-up to a thickness that is effective to obtain desired finished dimensions after performing a hot isostatic pressing treatment. The hot isostatic pressing treatment is performed on the coated workpiece substrate to obtain a metal product having the desired finished dimensions and diffusion bonding between the coating material and the workpiece substrate.

The inventive method can also be used for forming a cast metal product. This method can be employed to produce, for example, a cast part having a hard and/or smooth surface. In accordance with the present invention, a part is cast to dimensions to less than the finished dimensions, or a cast part is machined to less than the finished dimensions. The cast part is then coated using the HVOF coating method as described herein. The HVOF coating is applied to a thickness sufficient to bring the part to its finished dimensions. The HVOF coated, cast part is then HIP treated as described herein to obtain a finished part having desired dimensions and surface characteristics.

In accordance with this aspect of the invention, a cast metal workpiece is provided. The cast metal workpiece may be formed from any conventional casting method such as: investment, sand and resin shell casting.

The cast metal workpiece is machined, if necessary, to near-finished dimensions. A high-density coating process, such as a hyper velocity oxy-fuel thermal spray process, is performed to coat the workpiece substrate with a coating material. The coating material is built-up to a thickness effective to obtain desired finished dimensions after performing a hot isostatic pressing treatment. The hot isostatic pressing treatment is performed on the coated workpiece substrate to obtain a metal product having the desired finished dimensions and diffusion bonding between the coating material and the workpiece substrate.

The inventive method can be used for repairing a turbine engine part, such as a blade or vane. In accordance with this aspect of the invention a turbine engine part, which is, comprised of a metal or metal alloy, is first cleaned. If necessary, eroded portions of the turbine engine part are welded using a weld material comprised of the same metal or metal alloy as the parent or original metal engine part. The welding operation is performed to build up heavily damaged or eroded portions of the turbine engine part. If the part is not heavily damaged, the welding operation may be obviated. The welding operation will typically produce weld witness lines. The weld witness lines are ground flush to prevent blast material from becoming entrapped in the weld witness lines. Portions of the engine part that are not to be HVOF sprayed are masked, and the engine part is again cleaned in preparation for HVOF spraying. HVOF plasma spraying of the unmasked portions of the engine part is performed. The HVOF plasma spray material (coating material) is comprised of the same metal alloy as the parent or original metal engine part. The HVOF plasma spray material is applied so as to build up a cordal dimension of the engine part to a thickness greater than the thickness of an original cordal dimension of the engine part. A hot isostatic pressing (HIP) treatment is performed on the coated engine part to densify the coating material, to create a diffusion bond between the coating material and the parent and the weld material, and to eliminate voids between the turbine engine part, the weld material and the coated material. Finally, the engine part is machined, ground and/or polished to the original cordal dimension.

BRIEF DESCRIPTION OF THE DRAWINGS

FIG. 2(a) is a schematic view of a tool substrate provided in accordance with the inventive method of forming metal components having a wear resistant coating;

FIG. 2(b) is a schematic view of the tool substrate having a wear resistant coating applied using an HVOF thermal spray process in accordance with the inventive method of treating metal components having a wear resistant coating;

FIG. 2(c) is a schematic view of the HVOF spray coated tool substrate undergoing a HIP treatment process in a HIP vessel in accordance with the inventive method of forming metal components having a wear resistant coating;

FIG. 2(d) is a schematic view of the final HVOF spray coated and HIP treated tool having a wear resistant coating layer diffusion bonded to the tool substrate in accordance with the inventive method of forming metal components having a wear resistant coating;

FIG. 5(a) is a schematic side view of a worn turbine engine part before undergoing the inventive method of repairing a turbine engine part;

FIG. 5(b) is a schematic cross-sectional view of the worn turbine engine part before undergoing the inventive method of repairing a turbine engine part;

FIG. 6(a) is a schematic side view of the worn turbine engine part showing the worn areas to be repaired using the inventive method of repairing a turbine engine part;

FIG. 6(b) is a schematic cross-sectional view of the worn turbine engine part showing the worn areas to be repaired using the inventive method of repairing a turbine engine part;

FIG. 7(a) is a schematic side view of the worn turbine engine part showing the worn areas filled in with similar weld material in accordance with the inventive method of repairing a turbine engine part;

FIG. 7(b) is a schematic cross-sectional view of the worn turbine engine part showing the worn areas filled in with similar weld material in accordance with the inventive method of repairing a turbine engine part;

FIG. 8(a) is a schematic side view of the welded turbine engine part showing areas to be built up with similar coating material using an HVOF spray coating process in accordance with the inventive method of repairing a turbine engine part;

FIG. 8(b) is a schematic cross-sectional view of the welded turbine engine part showing areas to be built up with similar coating material using an HVOF spray coating process in accordance with the inventive method of repairing a turbine engine part;

FIG. 9(a) is a schematic side view of the HVOF built up, welded turbine engine part showing an area masked before performing the HVOF spray coating process in accordance with the inventive method of repairing a turbine engine part;

FIG. 9(b) is a schematic cross-sectional view of the HVOF built up, welded turbine engine part in accordance with the inventive method of repairing a turbine engine part;

FIG. 10 is a schematic view of the HVOF built up, welded turbine engine part undergoing a HIP treatment process in a HIP vessel in accordance with the inventive method of repairing a turbine engine part;

DETAILED DESCRIPTION OF THE INVENTION

Figure 1:
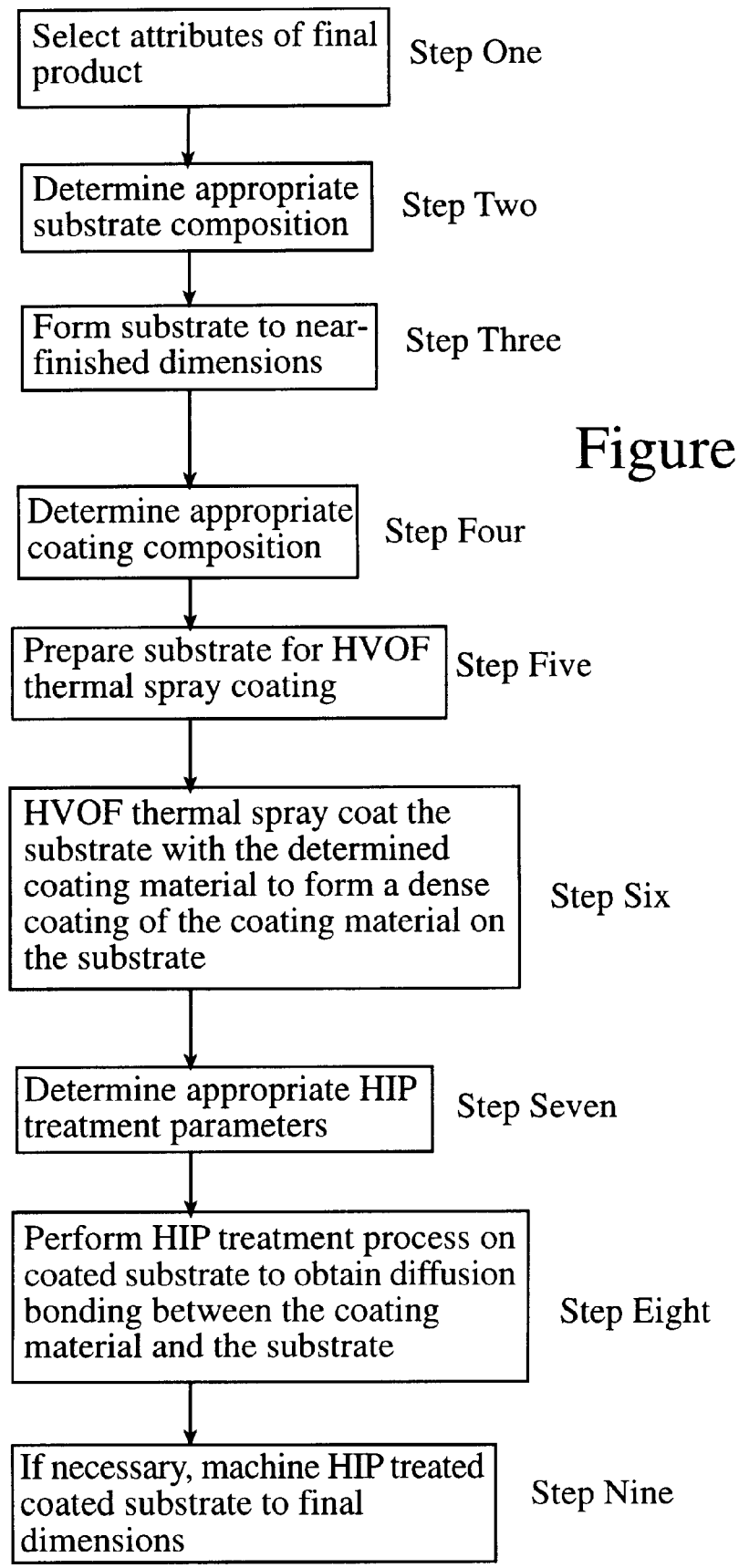
FIG. 1 is a flow chart showing the steps of the inventive method of forming metal products and metal components having a wear resistant coating.

For purposes of promoting an understanding of the principles of the invention, reference will now be made to the embodiments illustrated in the drawings and specific language will be used to describe the same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

FIG. 1 is a flow chart showing the steps of the inventive method of forming metal products and metal components having a wear resistant coating. In accordance with the present invention a method of forming a metal product having diffusion bonding occurring between a metal substrate and an applied coating is provided. The first step of the inventive method is to determine the attributes of a final workpiece product (Step One). For example, if the final workpiece product is a cutting tool the attributes include a wear resistant surface formed on a relatively inexpensive tool substrate 10. If the final workpiece is a cast metal component, a decorative, smooth final surface may be desired on a cast substrate 16.

An appropriate substrate composition is then determined (Step Two) depending on the selected attributes. In the example of a cutting tool, the substrate composition may be high speed steel, which is relatively inexpensive to form but durable enough for its intended purpose. In the case of a cast metal component, the cast workpiece substrate can be formed from cast iron or aluminum (or other cast metal or metal alloy). A workpiece substrate is formed to near-finished dimensions (Step Three), using known processes such as casting, extruding, molding, machining, etc. An appropriate coating material 12 composition is determined depending on the selected attributes (Step Four). Again, in the example of a cutting tool the coating material 12 could be selected from a number of relatively hard and durable metals and alloys such as Cobalt, Carbide, TiN, etc. In the example of the cast metal component, aluminum oxide may be chosen to provide both a decorative and corrosion resistant surface. The selection of both the substrate and coating composition also depends on their metallurgical compatibility with each other.

The workpiece substrate is prepared for a high-density coating process (Step Five). The preparation may include cleaning, blasting, machining, masking or other like operations. Once the workpiece substrate has been prepared, a high-density coating process is performed to coat the workpiece substrate (Step Six). The coating material 12 is built-up to a thickness that is effective to obtain desired finished dimensions after performing a hot isostatic pressing treatment (described below). The high-density coating process may comprises performing a hyper velocity oxy-fuel thermal spray process. In the case of HVOF, a fuel gas and oxygen are used to create a combustion flame at 2500 to 3100° C. The combustion takes place at a very high chamber pressure and a supersonic gas stream forces the coating material 12 through a small-diameter barrel at very high particle velocities. The HVOF process results in extremely dense, well-bonded coatings. Typically, HVOF coatings can be formed nearly 100% dense, with at a porosity of about 0.5%.

The high particle velocities obtained using the HVOF process results in relatively better bonding between the coating material 12 and the substrate, as compared with other coating methods such as the Conventional Plasma spray method or the Chemical Vapor Deposition method. However, the HVOF process also forms a bond between the coating material 12 and the substrate that occurs primarily through mechanical adhesion at a bonding interface. As will be described below, in accordance with the present invention this mechanical bond is converted to a metallurgical bond by creating a diffusion bond between the coating material 12 and the workpiece substrate. The diffusion bond does not have the interface boundary which is usually the site of failure.

The diffusion bond is created by subjecting the coated workpiece substrate to a hot isostatic pressing (HIP) treatment. The appropriate hot isostatic pressing treatment parameters are selected depending on the coating, the workpiece substrate and the final attributes that are desired (Step Seven). The hot isostatic pressing treatment is performed on the coated workpiece substrate to obtain a metal product having the desired finished dimensions and diffusion bonding between the coating material 12 and the workpiece substrate (Step Eight).

By proper formation of the workpiece substrate, the final dimensions of the finished workpiece product can be accurately achieved through the precise control of the build up of coating material 12 when the HVOF plasma spray process is performed. Alternatively, the HIP treated and HVOF coated workpiece substrate may be machined to final dimensions as necessary (Step Nine).

HIP treatment is conventionally used in the densification of cast metal components and as a diffusion bonding technique for consolidating powder metals. In the HIP treatment process, a part to be treated is raised to a high temperature and isostatic pressure. Typically, the part is heated to 0.6–0.8 times the melting point of the material comprising the part, and subjected to pressures on the order of 0.2 to 0.5 times the yield strength of the material. Pressurization is achieved by pumping an inert gas, such as Argon, into a pressure vessel 14. Within the pressure vessel 14 is a high temperature furnace, which heats the gas to the desired temperature. The temperature and pressure is held for a set length of time, and then the gas is cooled and vented.

The HIP treatment process is used to produce near-net shaped components, reducing or eliminating the need for subsequent machining operations. Further, by precise control of the temperature, pressure and time of a HIP treatment schedule a particular microstructure for the treated part can be obtained.

In accordance with the present invention, the HIP treatment process is performed on a HVOF coated substrate to convert the adhesion bond, which is merely a relatively weaker mechanical bond, to a diffusion bond, which is a relatively stronger metallurgical bond. In accordance with the present invention, an HVOF coating process is used to apply the coating material 12 having sufficient density to effectively undergo the densification changes that occur during the HIP process. If the coating material 12 and the workpiece substrate are comprised of the same metal composition, then the diffusion bonding results in a seamless transition between the substrate and the coating.

As shown in FIGS. 2(a) through 2(d), the inventive method can be used for forming a metal product having a wear resistant surface. FIG. 2(a) is a schematic view showing a tool substrate 10 provided in accordance with the inventive method of forming metal components having a wear resistant coating. The inventive method can be employed to produce, for example, a long lasting cutting tool from a relatively inexpensive cutting tool substrate 10.

In accordance with this aspect of the invention, a workpiece substrate is formed to near-finished dimensions. The tool substrate 10 may be a drill bit, end mill, lathe tool bit, saw blade 18, planer knifes, cutting tool inserts, or other cutting tool part. The substrate may, alternatively, be something other than a tool. For example, ice skate blade 18s and snow ski edges may be treated in accordance with the present invention to obtain a long wearing edge. Kitchen knives may be treated in accordance with the present invention to reduce or even eliminate the need for constant sharpening. Further, products such as pen tips and fishing hooks may be treated in accordance with the present invention so as to benefit from long lasting durability. Nearly any metal component that could benefit from a longer wearing, dense surface structure might be a candidate from the present invention. For example, steam turbine erosion shields, fly ash fan blade 18s, power plant conveyors, are all subjected to wear and/or surface erosion forces. The present invention can be used to provide the protective surface characteristics, as described herein, that enhance the effectiveness of products such as these.

FIG. 2(b) is a schematic view of the tool substrate 10 having a wear resistant coating applied using an HVOF thermal spray process in accordance with the inventive method. A high-density coating process, such as a hyper velocity oxy-fuel thermal spray process, is performed to coat the workpiece substrate 10 with a wear resistant coating material 12 using, for example, an HVOF nozzel. The coating material 12 is built-up to a thickness that is effective to obtain desired finished dimensions after performing a hot isostatic pressing treatment.

FIG. 2(c) is a schematic view of the HVOF spray coated tool substrate 10 undergoing a HIP treatment process in a HIP vessel 14. The hot isostatic pressing treatment is performed on the coated workpiece substrate to obtain a metal product having the desired finished dimensions and diffusion bonding between the coating material 12 and the workpiece substrate.

FIG. 2(d) is a schematic view of the final HVOF spray coated and HIP treated tool having a wear resistant coating layer diffusion bonded to the tool substrate 10. In accordance with the present invention the mechanical bond formed between the parent substrate and the applied coating is converted to a metallurgical bond by creating a diffusion bond between the coating material 12 and the parent substrate. The diffusion bond does not have the interface boundary which is usually the site of failure, thus a superior product is obtained that has desired surface properties, such as wear resistance, color, smoothness, texture, etc. These surface properties do not end abruptly at a bonding interface (as is the case of conventional coated or brazed products), but rather remain present to a continuously varying degree from the product surface to the parent metal.

Figure 3A:
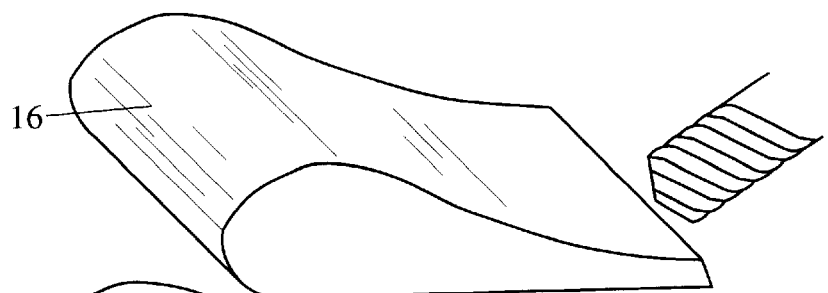
FIG. 3(a) is a schematic perspective view of a cast metal component undergoing a machining operation in accordance with the inventive method of forming a metal product.
Figure 3B:
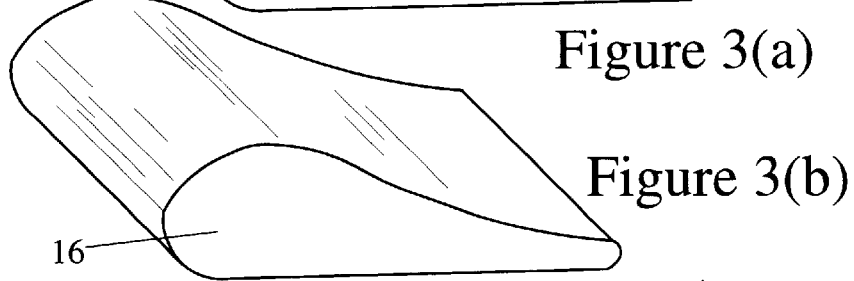
FIG. 3(b) is a schematic perspective view of the machined cast metal component in accordance with the inventive method of forming a metal product.

FIGS. 3(a) through 3(e) illustrate the present inventive method employed for forming a cast metal product having predetermined dimensions and surface characteristics. FIG. 3(a) is a schematic perspective view of a cast metal workpiece substrate undergoing a machining operation. As shown in FIG. 3(a), the cast metal workpiece is machined, if necessary, to near-finished dimensions. FIG. 3(b) is a schematic perspective view of the machined cast metal component.

Figure 3C:
FIG. 3(c) is a schematic perspective view of the machined cast metal component having a coating applied using an HVOF thermal spray process in accordance with the inventive method of forming a metal product.
Figure 3D:
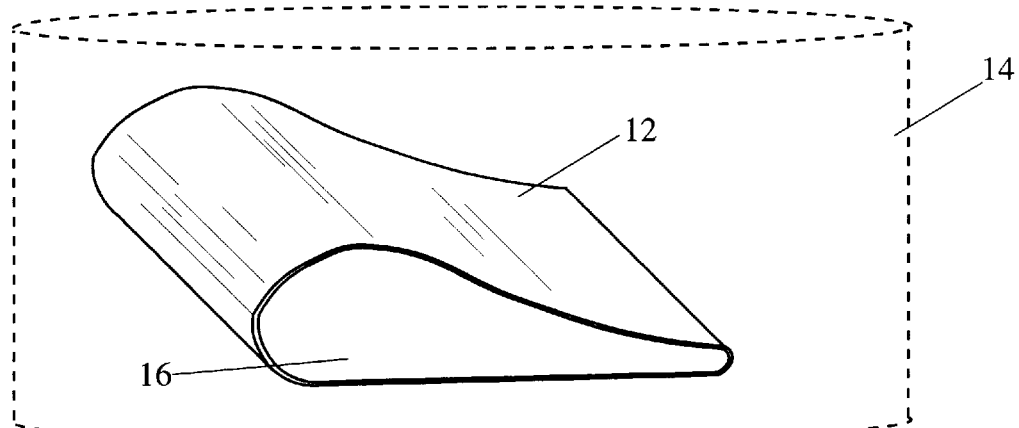
FIG. 3(d) is a schematic perspective view of the HVOF spray coated machined cast metal component undergoing a HIP treatment process in a HIP vessel in accordance with the inventive method of forming a metal product.
Figure 3E:
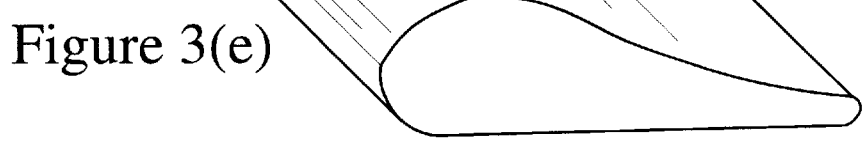
FIG. 3(e) is a schematic perspective view of the final HVOF spray coated and HIP treated machined cast metal product having a coating layer diffusion bonded to the machined cast metal component in accordance with the inventive method of forming a metal product.

A high-density coating process, such as a hyper velocity oxy-fuel thermal spray process, is performed to coat the workpiece substrate with a coating material 12. FIG. 3(c) is a schematic perspective view of the machined cast metal component having a coating applied using an HVOF thermal spray process. The coating material 12 is built-up to a thickness effective to obtain desired finished dimensions after performing a hot isostatic pressing treatment. FIG. 3(d) is a schematic perspective view of the HVOF spray coated machined cast metal component undergoing a HIP treatment process in a HIP vessel 14. The hot isostatic pressing treatment is performed on the coated workpiece substrate to obtain a metal product having the desired finished dimensions and diffusion bonding between the coating material 12 and the workpiece substrate. FIG. 3(e) is a schematic perspective view of the final HVOF spray coated and HIP treated machined cast metal product having a coating layer diffusion bonded to the machined cast metal component.

Figure 4:
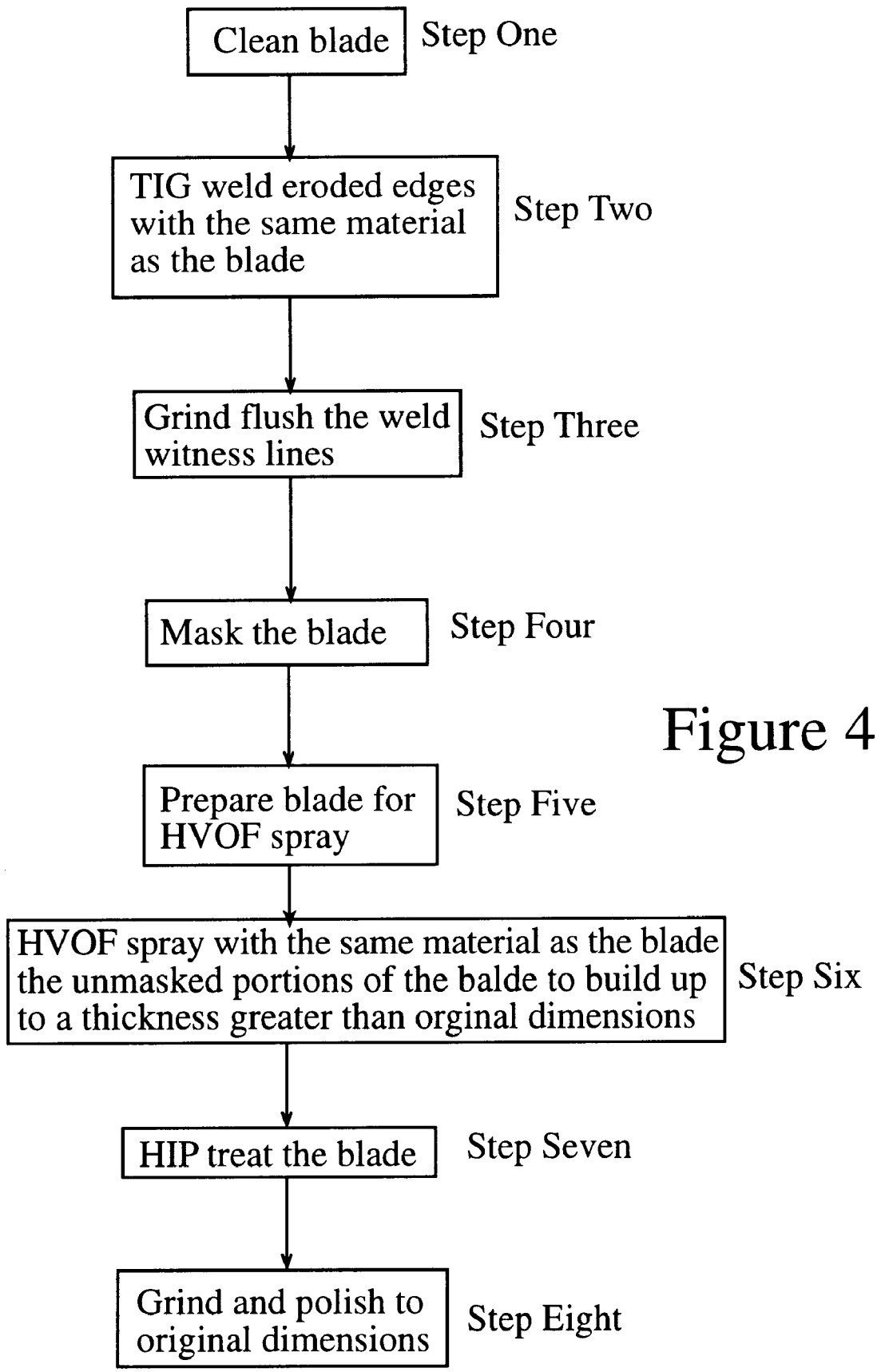
FIG. 4 is a flow chart showing the steps of the inventive method of repairing a turbine engine part.

FIG. 4 is a flow chart showing the steps of the inventive method of repairing a turbine engine part. The present inventive method can be used for repairing a turbine engine part, such as a blade 18 or vane. In accordance with this aspect of the invention a turbine engine part, which is comprised of a metal or metal alloy, is first cleaned (Step One). If necessary, eroded portions of the turbine engine part are welded using a weld material comprised of the same metal or metal alloy as the parent or original metal engine part (Step Two). The welding operation is performed to build up heavily damaged or eroded portions of the turbine engine part. If the part is not heavily damaged, the welding operation may be obviated.

The welding operation will typically produce weld witness lines. The weld witness lines are ground flush to prevent blast material from becoming entrapped in the weld witness lines (Step Three). Portions of the engine part that are not to be HVOF sprayed are masked (Step Four), and the engine part is again cleaned in preparation for HVOF spraying (Step Five). HVOF plasma spraying of the unmasked portions of the engine part is performed (Step Six). The HVOF plasma spray material (coating material 12) is comprised of the same metal alloy as the parent or original metal engine part. The HVOF plasma spray material is applied so as to build up a cordal dimension of the engine part to a thickness greater than the thickness of an original cordal dimension of the engine part. A hot isostatic pressing (HIP) treatment if performed on the coated engine part to densify the coating material 12, to create a diffusion bond between the coating material 12 and the parent and weld material, and to eliminate voids between the turbine engine part, the weld material and the coated material (Step Seven). Finally, the engine part is machined, ground and/or polished to the original cordal dimension (Step Eight).

FIG. 5(a) is a schematic side view and FIG. 5(b) is a schematic cross-sectional view of a worn turbine engine part before undergoing the inventive method of repairing a turbine engine part. Metal alloy components, such as gas turbine parts such as blade 18s and vanes, are often damaged during use. During operation, gas turbine parts are subjected to considerable degradation from high pressure and centrifugal force in a hot corrosive atmosphere. The gas turbine parts also sustain considerable damage due to impacts from foreign particles. This degradation results in a limited service life for these parts. Since they are costly to produce, various conventional repair methods are employed to refurbish damaged gas turbine blade 18s and vanes. However, these conventional repair methods generally require labor intensive machining and welding operations that often subject the part to damaging stress. Also, these conventional repair methods typically utilize low pressure plasma spray for the application of a coating material 12. Conventional plasma spray coating methods deposit the coating material 12 at relatively low velocity, resulting in voids being formed within the coating and in a coating density typically having a porosity of about 5.0%. Again, the bond between the substrate and the coating occurs primarily through mechanical adhesion at a bonding interface, and if the coating is subjected to sufficient shearing forces it will flake off of the workpiece substrate. Further, the high porosity of the coating obtained through conventional plasma spray coating make them inadequate candidates for diffusion bonding through the HIP treating process described herein.

FIG. 6(a) is a schematic side view and FIG. 6(b) is a schematic cross-sectional view of the worn turbine engine part showing the worn areas 20 to be repaired using the inventive method of repairing a turbine engine part. The area enclosed by the dashed lines represent the material that has been erode or otherwise lost from the original turbine engine part. In accordance with the present invention, this area is reconstituted using the same material as the original blade 18 and using the inventive metal treatment process. The worn turbine engine part (in this case, a turbine blade 18) is first cleaned to prepare the worn surfaces for welding (see Step One, FIG. 4).

FIG. 7(a) is a schematic side view and FIG. 7(b) is a schematic cross-sectional view of the worn turbine engine part showing the worn areas filled in with similar weld material 22 in accordance with the inventive method of repairing a turbine engine part (see Step Two, FIG. 4). In accordance with the present invention, the weld material is the same as the original blade 18 material making the bond between the weld and the substrate exceptionally strong.

FIG. 8(a) is a schematic side view and FIG. 8(b) is a schematic cross-sectional view of the welded turbine engine part 25 showing areas 24 to be built up with similar coating material 12 using an HVOF spray coating process in accordance with the inventive method of repairing a turbine engine part. In accordance with the present invention, the coating material 12 is the same as the original blade 18 material, again making the bond between the weld and the substrate exceptionally strong.

FIG. 9(a) is a schematic side view and FIG. 9(b) is a schematic cross-sectional view of the HVOF built up, welded turbine engine part 27 showing an area masked 26 before performing the HVOF spray coating process in accordance with the inventive method of repairing a turbine engine part. The coating material 12 is built-up to a thickness that is effective to obtain desired finished dimensions after performing a hot isostatic pressing treatment (described below).

The high-density coating process may comprise performing a hyper velocity oxy-fuel thermal spray process. In the case of HVOF, a fuel gas and oxygen are used to create a combustion flame at 2500 to 3100° C. The combustion takes place at a very high chamber pressure and a supersonic gas stream forces the coating material 12 through a small-diameter barrel at very high particle velocities. The HVOF process results in extremely dense, well-bonded coatings. Typically, HVOF coatings can be formed nearly 100% dense, with at a porosity of about 0.5%. The high particle velocities obtained using the HVOF process results in relatively better bonding between the coating material 12 and the substrate, as compared with other coating methods such as the conventional plasma spray method or the chemical vapor deposition method. However, the HVOF process also forms a bond between the coating material 12 and the substrate that occurs primarily through mechanical adhesion at a bonding interface. As will be described below, in accordance with the present invention this mechanical bond is converted to a metallurgical bond by creating a diffusion bond between the coating material 12 and the workpiece substrate. The diffusion bond does not have the interface boundary which is usually the site of failure.

The diffusion bond is created by subjecting the coated workpiece substrate to a hot isostatic pressing (HIP) treatment. The appropriate hot isostatic pressing treatment parameters are selected depending on the coating, the workpiece substrate and the final attributes that are desired. The hot isostatic pressing treatment is performed on the coated workpiece substrate to obtain a metal product having the desired finished dimensions and diffusion bonding between the coating material 12 and the workpiece substrate.

FIG. 10 is a schematic view of the HVOF built up, welded turbine engine part 27 undergoing a HIP treatment process in a HIP vessel 14 in accordance with the inventive method of repairing a turbine engine part.

HIP treatment is conventionally used in the densification of cast metal components and as a diffusion bonding technique for consolidating powder metals. In the HIP treatment process, a part to be treated is raised to a high temperature and isostatic pressure. Typically, the part is heated to 0.6–0.8 times the melting point of the material comprising the part, and subjected to pressures on the order of 0.2 to 0.5 times the yield strength of the material. Pressurization is achieved by pumping an inert gas, such as Argon, into a pressure vessel 14. Within the pressure vessel 14 is a high temperature furnace, which heats the gas to the desired temperature. The temperature and pressure is held for a set length of time, and then the gas is cooled and vented.

The HIP treatment process is used to produce near-net shaped components, reducing or eliminating the need for subsequent machining operations. Further, by precise control of the temperature, pressure and time of a HIP treatment schedule a particular microstructure for the treated part can be obtained.

Figure 11A:
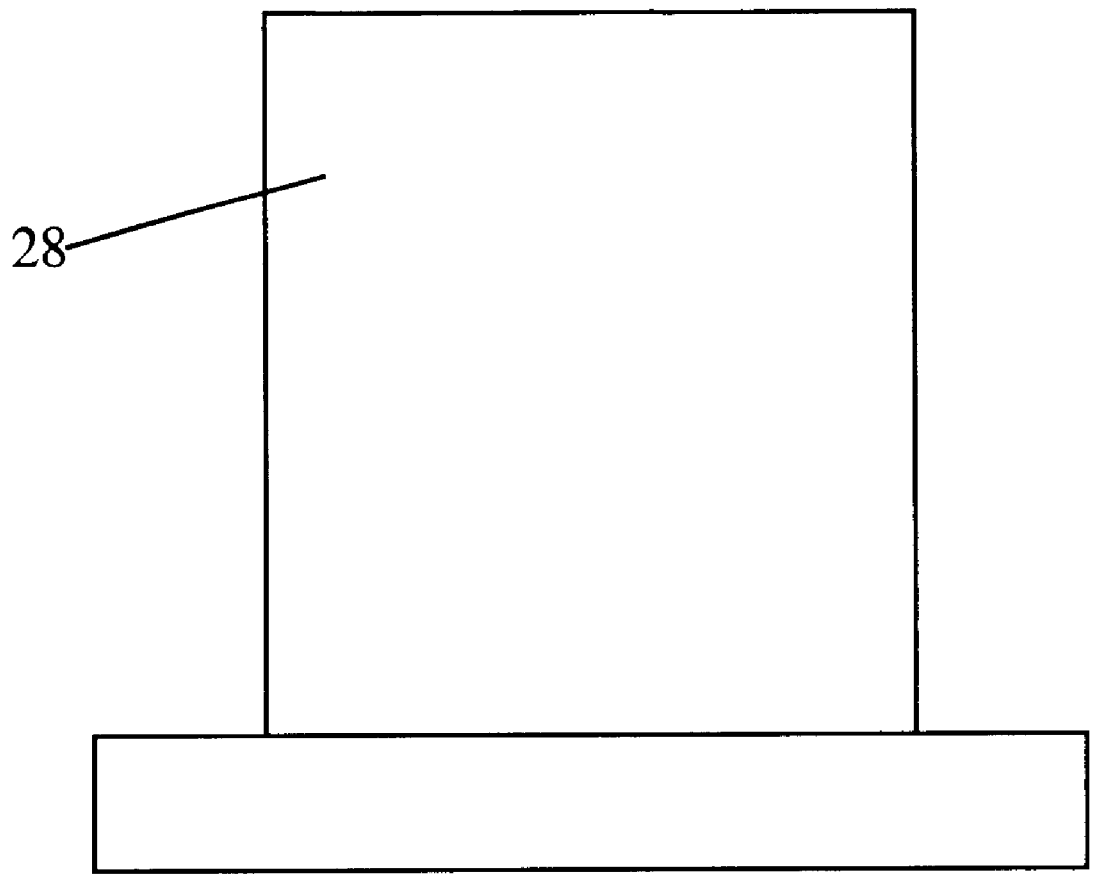
FIG. 11(a) is a schematic side view of the final HVOF spray coated and HIP repaired turbine engine part having a similar metal coating layer diffusion bonded to the original parent substrate and welded portions in accordance with the inventive method of repairing a turbine engine part.
Figure 11B:
FIG. 11(b) is a schematic cross-sectional view of the final HVOF spray coated and HIP repaired turbine engine part having a similar metal coating layer diffusion bonded to the original parent substrate and welded portions in accordance with the inventive method of repairing a turbine engine part.
Figure 12A:
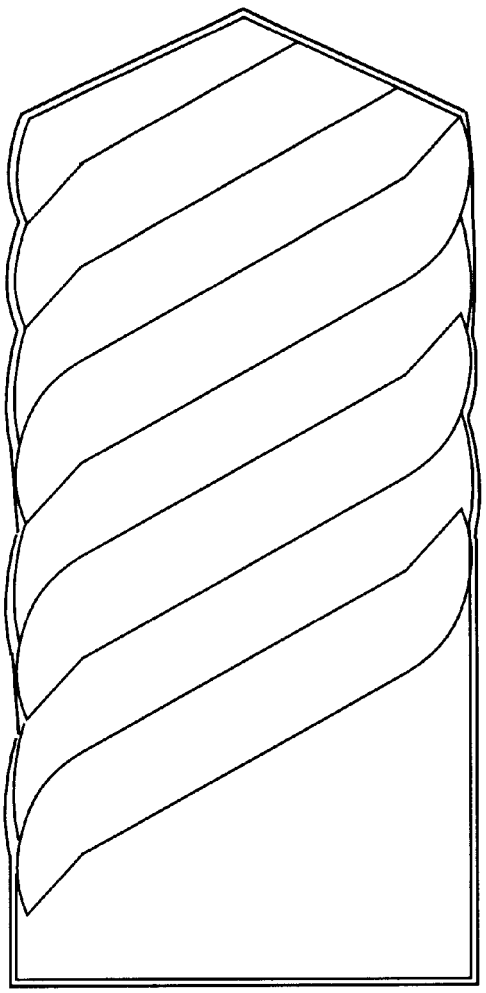
FIG. 12(a) is a side view of a prior art tool bit coated with a wear resistant coating.
Figure 12B:
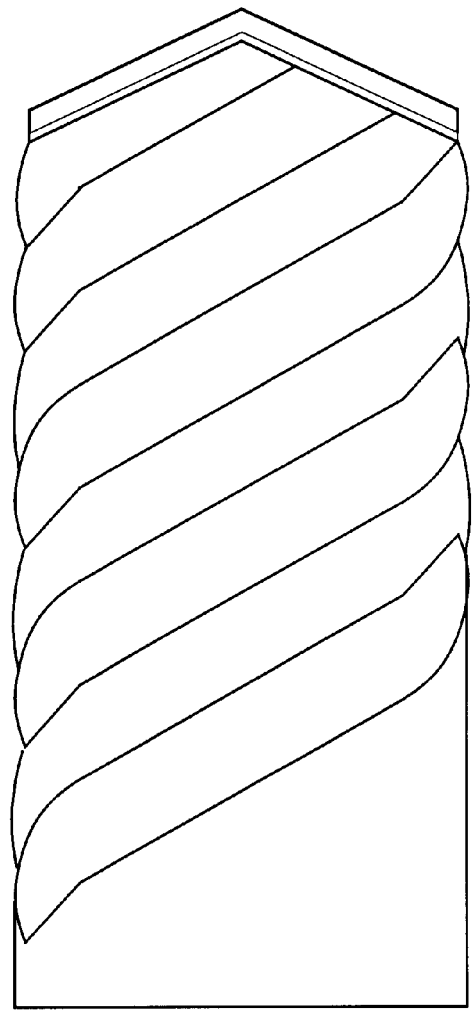
FIG. 12(b) is a side view of a prior art tool bit having a fixed wear resistant cutting tip.

FIG. 11(a) is a schematic side view and FIG. 11(b) is a schematic cross-sectional view of the final HVOF spray coated and HIP repaired turbine engine part 28 having a similar metal coating layer diffusion bonded to the original parent substrate and welded portions in accordance with the inventive method of repairing a turbine engine part. By proper formation of the workpiece substrate, the final dimensions of the finished workpiece produce can be accurately achieved through the precise control of the build up of coating material 12 when the HVOF plasma spray process is performed. Alternatively, the HIP treated and HVOF coated workpiece substrate may be machined to final dimensions as necessary (Step Eight).

An experimental test piece was prepared in accordance with the inventive method of treating metal components. Photomicrographs of the test piece showed the grain structure and diffusion bonding of the coating material 12 and the substrate after the inventive method has been performed. The HIP treatment process was performed on an HVOF coated test substrate to convert the adhesion bond between the coating and the substrate, which is merely a mechanical bond, to a diffusion bond, which is a metallurgical bond. In accordance with the present invention, an HVOF coating process is used to apply the coating material 12 having sufficient density to effectively undergo the densification changes that occur during the HIP process. In the case of the test piece example, the coating material 12 and the workpiece substrate are comprised of the same metal composition. The diffusion bonding results in a transition between the substrate and the coating that has a much stronger structural integrity and wear characteristics as compared with the conventional art.

The test piece was prepared by building up coating material 12 to a thickness of approximately 0.02 inches, and the composition of the test pieces was determined at seven locations (A–G) across a cross section of the piece. The composition was found to be substantially uniform across the cross-section of the test piece, as shown in the following table.

TABLE I

| Element | Elemental Composition (Weight %) | | | | | | |
|---|---|---|---|---|---|---|---|
| | A | B | C | D | E | F | G |
| Aluminum | 5.4 | 5.2 | 5.5 | 6.2 | 6.3 | 6.4 | 6.5 |
| Titanium | 0.6 | 0.6 | 1.0 | 0.6 | 1.0 | 0.6 | 0.9 |
| Chromium | 12.9 | 13.2 | 14.5 | 12.7 | 11.5 | 13.7 | 14.1 |
| Nickel | REM | REM | REM | REM | REM | REM | REM |
| Niobium | 1.4 | 1.5 | 1.8 | 2.1 | 1.7 | 2.3 | 2.6 |
| Molybdenum | 3.7 | 4.1 | 3.6 | 3.3 | 3.4 | 3.9 | 3.0 |

A photomicrograph of the treated workpiece shows the grain structure and diffusion bonding of the coating material 12 and the substrate after the inventive method has been performed. In accordance with the present invention, the HIP treatment process is performed on a HVOF built up, welded turbine engine part to convert the adhesion bond, which is merely a mechanical bond, to a diffusion bond, which is a metallurgical bond. In accordance with the present invention, an HVOF coating process is used to apply the coating material 12 having sufficient density to effectively undergo the densification changes that occur during the HIP process. If the coating material 12 and the workpiece substrate are comprised of the same metal composition, then the diffusion bonding results in smooth transition between the substrate and the coating. In contrast, a conventional plasma spray coating method results in a relatively weak bond between the coating and the substrate. The bond is primarily due to a mechanical adhesion bond that occurs relatively locally within a boundary interface.

With respect to the above description, it is realized that the optimum dimensional relationships for parts of the invention, including variations in size, materials, shape, form, function, and manner of operation, assembly and use, are deemed readily apparent and obvious to one skilled in the art. All equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention.

I claim:

1. A method of repairing a turbine engine airfoil part, comprising the steps of: cleaning a turbine engine airfoil part, the turbine engine airfoil part having a substrate being comprised of a metal alloy; welding eroded portions of the turbine engine airfoil part using a weld material comprised of the metal alloy, the welding producing weld witness lines; grinding flush the weld witness lines to prevent blast material from becoming entrapped in the weld witness lines; masking portions of the turbine engine airfoil part that are not to be HVOF sprayed; recleaning the turbine engine airfoil part in preparation for HVOF spraying; HVOF spraying the turbine engine airfoil part using a coating material comprised of the same metal alloy as the substrate so as to build up a cordal dimension of the turbine engine airfoil part to a thickness greater than the thickness of an original cordal dimension of the turbine engine airfoil part; hot isostatic pressing treating the turbine engine airfoil part to eliminate voids between the turbine engine airfoil part substrate, the weld material and the coating material and to obtain diffusion bonding between the substrate and the coating material; and selectively removing portions of the HVOF spray material to finish the turbine engine airfoil part to the original cordal dimension.

2. A method of repairing a turbine engine part according to claim 1, wherein the step of hot isostatic pressing treating comprises the step of heating the engine part to a temperature that is substantially 80% of the melting point of the metal alloy; and pressurizing the engine part to a pressure substantially between 20 and 50 percent of the yield strength of the metal alloy in an inert gas atmosphere.

3. A method of repairing a turbine engine airfoil part, comprising the steps of: cleaning a turbine engine airfoil part, the turbine engine airfoil part having a metal alloy substrate; welding eroded portions of the turbine engine airfoil part using a weld material comprised of the metal alloy, the welding producing weld witness lines, grinding flush the weld witness lines to prevent blast material from becoming entrapped in the weld witness lines; masking portions of the turbine engine airfoil part that are not to be coated with a high density coating; recleaning the turbine engine airfoil part in preparation for high density coating; determining dimensional differences between pre-repaired dimensions of the turbine engine airfoil part and desired post-repair dimensions of the turbine engine airfoil part; determining a build-up thickness of high density coating material required to obtain the desired post-repair dimensions of the airfoil part; performing a high-density coating process; performing a hot isostatic pressing treatment to eliminate voids between the turbine engine airfoil part substrate, the weld material and the coating material and to obtain diffusion bonding between the substrate and the coating material; and selectively removing portions of the HVOF spray material to finish the turbine engine airfoil part to the desired post-repair dimensions.

4. A method of repairing a turbine engine airfoil part according to claim 3, wherein the step of performing the high-density coating process comprises performing a high-density coating process such as a hyper velocity oxy-fuel thermal spray process or a detonation gun process.

5. A method of repairing a turbine engine airfoil part according to claim 3, wherein the step of hot isostatic pressing treatment comprises the step of heating the engine part to a temperature that is substantially 80% of the melting point of the metal alloy; and pressurizing the engine part to a pressure substantially between 20 and 50 percent of the yield strength of the metal alloy in an inert gas atmosphere.

6. A method of repairing a turbine engine airfoil part according to claim 3, wherein the coating material built-up during the high-density coating process is comprised of the same metal alloy as the turbine engine airfoil part substrate.

7. A method of repairing a turbine engine airfoil part according to claim 3, wherein the dimensional differences between the pre-repaired dimensions of the turbine engine airfoil part and the desired post-repair dimensions of the turbine engine airfoil part are measured from at least one of the cordal and length dimensions of the airfoil part.

8. A method of repairing a turbine engine airfoil part, comprising the steps of: determining dimensional differences between pre-repair airfoil dimensions of a turbine engine airfoil part substrate and desired post-repair airfoil dimensions of the turbine engine airfoil part, the pre-repair airfoil dimensions having different airfoil characteristics than the post-repair airfoil dimension, the post-inspection-turbine engine airfoil part being comprised of a metal alloy; coating the engine part using a high-density coating process and a coating material comprised of the same metal alloy so as to build up the cordal dimensions of the turbine engine airfoil part to at least a desired post-repair cordal dimension of the turbine engine airfoil part so as to change the airfoil characteristics of the turbine engine airfoil part; hot isostatic pressing treating the turbine engine airfoil part to produce diffusion bonding between the turbine engine airfoil part and the coating material.

9. A method of repairing a turbine engine airfoil part according to claim 8, further comprising the steps of welding eroded portions of the turbine engine airfoil part using a weld material comprised of the same metal alloy, the welding process producing weld witness lines; grinding flush the weld witness lines to prevent blast material from becoming entrapped in the weld witness lines; masking portions of the turbine engine airfoil part that are not to be coated in the high-density coating process; and selectively removing portions of at least one of the weld material and the HVOF spray material to obtain the desired cordal dimension of the turbine engine airfoil part.

10. A method of repairing a turbine engine airfoil part according to claim 8, wherein the turbine engine airfoil part comprises a non-rotating engine part having a superalloy substrate and the coating material has the same alloy composition as the superalloy substrate.

11. A method of repairing a turbine engine airfoil part, comprising the steps of: determining dimensional differences between pre-repaired dimensions of a post-inspection turbine engine airfoil part and desired post-repair dimensions of the turbine engine airfoil part, the pre-repair airfoil dimensions having different airfoil characteristics than the post-repair airfoil dimension, the turbine engine airfoil part having a substrate comprised of a superalloy; determining a build-up thickness of coating material required to obtain the desired post-repair dimensions of the turbine engine airfoil part; performing a high-density coating process to coat the turbine engine airfoil part with a coating material to build-up a thickness of coating material effective to change the airfoil characteristics of the turbine engine airfoil part and obtain desired post repair dimensions after performing a hot isostatic pressing treatment, the coating material comprising a metal alloy capable of forming a diffusion bond with the substrate; and then performing the hot isostatic pressing process to obtain a post-repair turbine engine airfoil part having the desired post-repair dimensions and having diffusion bonding between the coating material and the turbine engine airfoil substrate.

12. A method of repairing a turbine engine airfoil part according to claim 11, wherein the post inspection turbine engine airfoil part comprises a non-rotating engine part having a superalloy substrate and the coating material has the same alloy composition as the superalloy substrate.

13. A method of repairing a turbine engine airfoil part according to claim 12, wherein the step of performing the high-density coating process comprises performing a high-density coating process such as a hyper velocity oxy-fuel thermal spray process or a detonation gun process.

14. A method of repairing a turbine engine airfoil part according to claim 13, wherein the step of hot isostatic pressing treating comprises the step of heating the engine part to a temperature that is substantially 80% of the melting point of the metal alloy; and pressurizing the engine part to a pressure substantially between 20 and 50 percent of the yield strength of the metal alloy in an inert gas atmosphere.

15. A method of repairing a turbine engine airfoil part according to claim 14, wherein the dimensional differences between the pre-repaired dimensions of a turbine engine airfoil part substrate and the desired post-repair dimensions of the turbine engine airfoil part are measured from at least one of the cordal and length dimensions of the airfoil part.

16. A method of repairing a turbine engine airfoil part according to claim 11, wherein the coating material built-up during the high-density coating process is comprised of the same material as the turbine engine airfoil part substrate.

17. A method of repairing a turbine engine airfoil part according to claim 11, wherein the turbine engine airfoil part comprises a rotating engine part.

18. A method of repairing a turbine engine airfoil part according to claim 12, wherein the superalloy substrate comprises a nickel-base superalloy.

19. A method of repairing a turbine engine airfoil part, comprising the steps of: cleaning a turbine engine airfoil part, the turbine engine airfoil part having a substrate being comprised of a metal alloy; determining if eroded portions of the turbine engine airfoil part require welding repair; welding eroded portions of the turbine engine airfoil part determined to need welding repair using a weld material comprised of the metal alloy, the welding producing weld witness lines; grinding flush the weld witness lines to prevent blast material from becoming entrapped in the weld witness lines; masking portions of the turbine engine airfoil part that are not to be high density coated; recleaning the turbine engine airfoil part in preparation for high density coating; high density coating the turbine engine airfoil part using coating material comprised of the same metal alloy as the substrate so as to build up a cordal dimension of the turbine engine airfoil part; hot isostatic pressing treating the turbine engine airfoil part to obtain diffusion bonding between the substrate and the coating material; and selectively removing portions of the high density coating to finish the turbine engine airfoil part to desired dimensions.

20. A method of repairing a turbine engine airfoil part according to claim 19, wherein the step of performing the high-density coating process comprises performing a high-density coating process such as a hyper velocity oxy-fuel thermal spray process or a detonation gun process.

21. A method of repairing a turbine engine airfoil part according to claim 20, wherein the step of hot isostatic pressing treatment comprises the step of heating the engine part to a temperature that is substantially 80% of the melting point of the metal alloy; and pressurizing the engine part to a pressure substantially between 20 and 50 percent of the yield strength of the metal alloy in an inert gas atmosphere.

22. A method of repairing a turbine engine airfoil part according to claim 21, wherein the coating material built-up during the high-density coating process is comprised of the same metal alloy as the turbine engine airfoil part substrate.

* * * * *